US007310517B2

(12) United States Patent
Wolff et al.

(10) Patent No.: US 7,310,517 B2
(45) Date of Patent: Dec. 18, 2007

(54) TECHNIQUES FOR ARCHIVING AUDIO INFORMATION COMMUNICATED BETWEEN MEMBERS OF A GROUP

(75) Inventors: Gregory J. Wolff, Redwood City, CA (US); Michael Terry, Atlanta, GA (US)

(73) Assignee: Ricoh Company, Ltd., Tokyo (JP)

( * ) Notice: Subject to any disclaimer, the term of this patent is extended or adjusted under 35 U.S.C. 154(b) by 883 days.

(21) Appl. No.: 10/116,749

(22) Filed: Apr. 3, 2002

(65) Prior Publication Data
US 2004/0121790 A1    Jun. 24, 2004

(51) Int. Cl.
H04M 3/42    (2006.01)
(52) U.S. Cl. ............... 455/416; 455/417; 455/421; 455/422; 455/518; 455/519; 455/520; 704/270
(58) Field of Classification Search ............. 704/270; 455/421, 518, 519, 416, 417, 422
See application file for complete search history.

(56) References Cited

U.S. PATENT DOCUMENTS

| 6,295,284 | B1 | 9/2001 | Maggenti | |
| 6,321,197 | B1* | 11/2001 | Kushner et al. | 704/270 |
| 6,332,122 | B1* | 12/2001 | Ortega et al. | 704/270 |
| 6,741,853 | B1* | 5/2004 | Jiang et al. | 455/418 |
| 6,765,996 | B2* | 7/2004 | Baxter, Jr. | 379/88.14 |
| 6,775,651 | B1* | 8/2004 | Lewis et al. | 704/235 |
| 6,850,602 | B1* | 2/2005 | Chou | 379/80 |
| 2002/0026489 | A1* | 2/2002 | Homma | 709/206 |
| 2002/0118798 | A1* | 8/2002 | Langhart et al. | 379/67.1 |

FOREIGN PATENT DOCUMENTS

| JP | 8307417 | 11/1996 |
| JP | 10285531 | 10/1998 |

OTHER PUBLICATIONS

Ackerman et al., "Hanging on the wire: a field study of an audio-only media space," *ACM Transactions on Computer-Human interaction (TOCHI)*, 4(1):39-66 (1997).
Go et al., "Familyware: Communicating with someone you love," *2000 IFIP HOIT Conference (HOIT 2000)*.
Hindus et al., "Thunderwire: a field study of an audio-only media space," *Proceedings of the 1996 ACM Conference on Computer supported cooperative work*, pp. 238-247, ACM Press (1996).

(Continued)

*Primary Examiner*—David Hudspeth
*Assistant Examiner*—Jakieda R. Jackson
(74) *Attorney, Agent, or Firm*—Townsend and Townsend and Crew LLP

(57) ABSTRACT

Techniques for archiving audio information communicated between members of a group using an audio communication system such as a point-to-multipoint audio communication system. The archived audio information can then be retrieved by members of the group or by any other user at any time subsequent to the live transmission of the audio information. Audio information communications between communication devices used by members of a group are monitored and recorded. The recorded audio information is then analyzed to identify one or more conversation portions in the audio information. Audio information corresponding to the conversation portions is then archived. The archived information is then available for retrieval.

84 Claims, 9 Drawing Sheets

OTHER PUBLICATIONS

Hindus et al., "Ubiquitous audio: capturing spontaneous collaboration," *Proceedings of the 1992 ACM Conference on Computer-supported cooperative work*, pp. 210-217, ACM Press, (1992).

Hindus et al., "Capturing, structuring, and representing ubiquitous audio," *ACM Transactions on Information Systems (TOIS)*, 11(4):376-400 (1993).

Hindus et al., "Casablanca: designing social communication devices for the home," *Proceedings of the SIGCHI conference on Human factors in computing systems*, pp. 325-332, ACM Press (2001).

Hudson et al., "Techniques for Addressing Fundamental Privacy and Disruption Tradeoffs in Awareness Support Systems," *CSCW 1996*, pp. 248-257 (1996).

i-pot product description printed from http://www.mimamori.net on Jan. 20, 2005.

Kidd et al., "The Aware Home: A Living Laboratory for Ubiquitous Computing Research," *Proceedings of 2nd International Workshop on Cooperative Buildings 1999*.

Mynatt et al., "Digital Family Portraits: Supporting Peace of Mind for Extended Family Members," *CHI 2001*, pp. 333-340 (2001).

Nagel et al., "the Family Intercom: Developing a Context-Aware Communication System," *Proceedings of Ubicomp 2001*, Springer-Verlag (2001).

Sawney et al., "Nomadic Radio: Speech and Audio Interaction for Contextual Messaging in Nomadic Environments," *ACM Transactions on Computer-Human Interaction*, 7(3):353-383 (2000).

Singer et al., "Tangible progress: Less is more in somewire audio spaces," *Proceedings of the SIGCHI conference on Human factors in computing systems*, pp. 104-111, ACM press (1999).

Office Action received in corresponding Japanese Application No. 2003-099175, dated Jul. 3, 2007 (with unverified machine translation) (5 pages).

\* cited by examiner

TECHNIQUES FOR ARCHIVING AUDIO INFORMATION COMMUNICATED BETWEEN MEMBERS OF A GROUP

CROSS-REFERENCES TO RELATED APPLICATIONS

The present application incorporates by reference for all purposes the entire contents of U.S. Non-Provisional Application Ser. No. 09/407,010, entitled "METHOD & APPARATUS FOR GENERATING VISUAL REPRESENTATIONS FOR AUDIO DOCUMENTS" filed Sep. 28, 1999.

BACKGROUND OF THE INVENTION

The present invention relates to audio communication systems, and more particularly to techniques for recording audio information communicated between users in a point-to-multipoint audio communication system.

Group broadcasting or point-to-multipoint audio communication systems are commonly used to communicate audio information between users of the systems. In a point-to-multipoint audio communication system, a group of users, each equipped with a communication device, can communicate audio information with other members of the group. Audio information transmitted by a member of the group using the member's communication device is simultaneously communicated to communication devices of the other members of the group. Examples of point-to-multipoint audio communication systems include wireless systems that use walkie-talkies, CB radios, cellular telephones (e.g., Nextel phones with direct connect feature), hardwire systems, telephone systems, intercoms, or the like.

Existing point-to-multipoint audio communication systems share the disadvantage that when a member of a group transmits audio information using the member's communication device, the other members of the group have to be present to listen to the transmitted audio information at the time the member transmits the information. The audio information is lost after it has been transmitted and output via the members' communication devices. Accordingly, if a particular member of the group is unable to listen to the live audio transmission (e.g., if the particular user member's communication device is turned off), the transmitted audio information is lost and cannot be retrieved or accessed by the particular member at a later time.

In light of the above, it would be desirable to provide techniques that can unintrusively archive audio information communicated in a point-to-multipoint audio communication system such that a user can retrieve the archived audio information subsequent to the time of transmission of the information.

BRIEF SUMMARY OF THE INVENTION

Embodiments of the present invention provide techniques for archiving audio information communicated between members of a group using an audio communication system such as a point-to-multipoint audio communication system. The archived audio information can then be retrieved by members of the group or by any other user at any time subsequent to the live transmission of the audio information. According to an embodiment of the present invention, audio information communications between communication devices used by members of a group are monitored and recorded. The recorded audio information is then analyzed to identify one or more conversation portions in the audio information. Audio information corresponding to the conversation portions is then archived. The archived information is then available for retrieval.

According to an embodiment of the present invention, techniques are provided for archiving audio information communicated between a plurality of communication devices in a point-to-multipoint audio communication system. In this embodiment, audio information transmitted by one or more communication devices of the plurality of communication devices is recorded. One or more conversation portions, including a first conversation portion, are then determined from the recorded audio information. Each conversation portion comprises audio information transmitted by one or more communication devices from the plurality of communication devices. Audio information included in the first conversation portion is stored. Other information related to the first conversation portion may also be stored.

According to another embodiment of the present invention, techniques are provided for storing audio information communicated between a plurality of communication devices in a point-to-multipoint audio communication system. In this embodiment, audio information transmitted by the plurality of communication devices is recorded. One or more conversation portions, including a first conversation portion, are then determined from the recorded audio information. Each conversation portion comprises audio information transmitted by one or more communication devices from the plurality of communication devices. The audio information included in the first conversation portion is transcribed to generate a text transcript for the first conversation portion. The text transcript is stored such that a user can subsequently retrieve the text transcript.

According to yet another embodiment of the present invention, techniques are provided for outputting an audio signal using a device. In this embodiment, the device provides a user-selectable control capable of being set to a first position or a second position. The device receives a first audio signal at the device. A check is then made to see if the user-selectable control has been set to the first position or the second position. The first audio signal is output via the device if it is detected that the user-selectable control has been set to the first position. A second audio signal is output via the device if it is detected that the user-selectable control has been set to the second position.

The foregoing, together with other features, embodiments, and advantages of the present invention, will become more apparent when referring to the following specification, claims, and accompanying drawings.

DETAILED DESCRIPTION OF THE INVENTION

The present invention provides techniques for archiving audio information communicated between members of a group using an audio communication system such as a point-to-multipoint audio communication system. The archived audio information can then be retrieved by members of the group or by any other user at any time subsequent to the live transmission of the audio information. According to an embodiment of the present invention, audio information communications between communication devices used by members of a group are monitored and recorded. The recorded audio information is then analyzed to identify one or more conversation portions in the audio information. The origination points of audio information in the conversation portions are also identified. For example, the speakers involved in a conversation portion are identified. Audio information corresponding to the conversation portions is then archived. The conversation portions may be archived in various different formats. According to an embodiment of the present invention, the conversation portions are transcribed and the text transcripts may be subsequently retrieved by users of the present invention.

Figure 1:
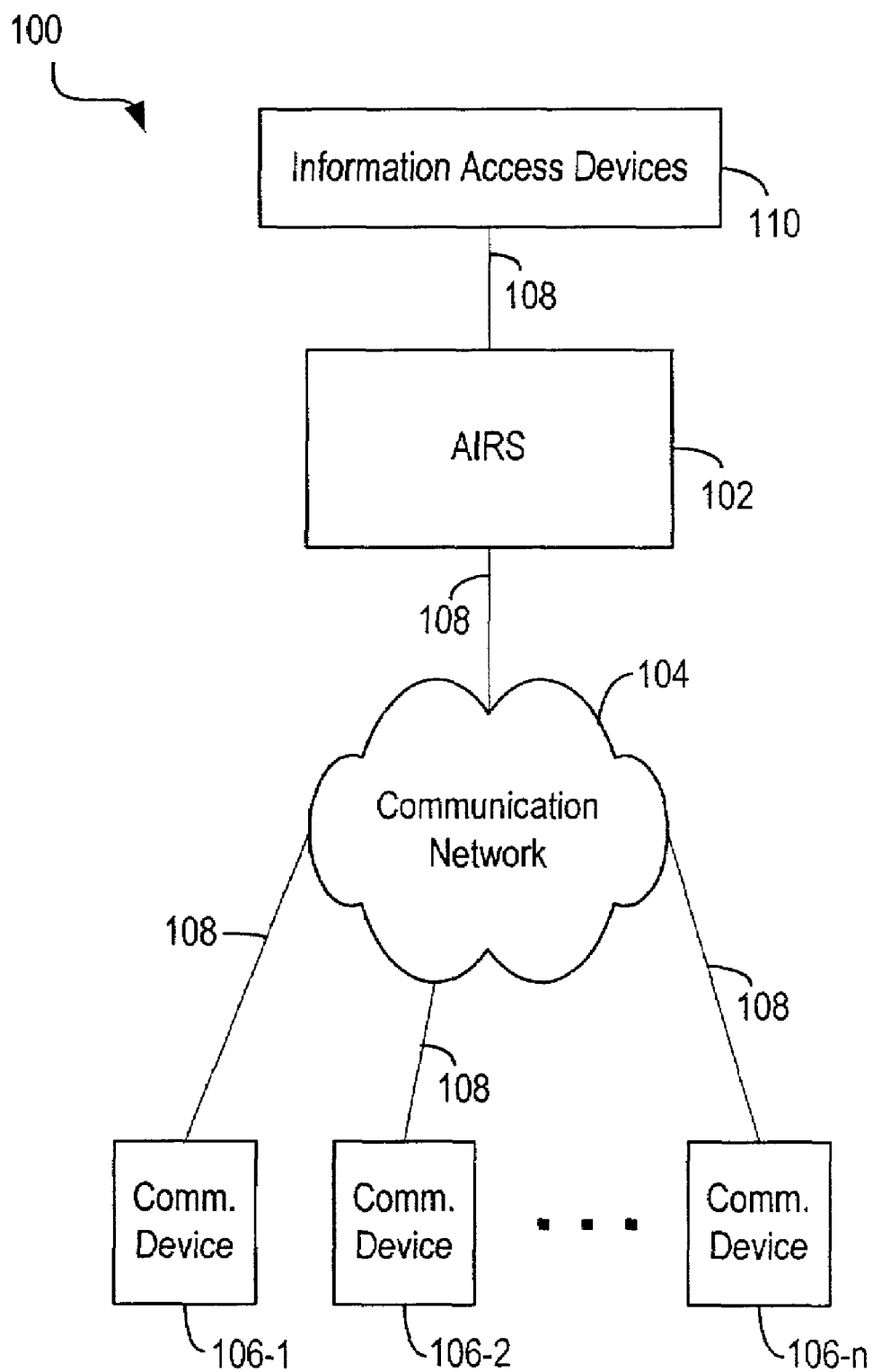
FIG. 1 is a simplified block diagram of a point-to-multipoint audio communication system that might incorporate an embodiment of the present invention.

FIG. 1 is a simplified block diagram of a point-to-multipoint audio communication system 100 that might incorporate an embodiment of the present invention. As depicted in FIG. 1, point-to-multipoint audio communication system 100 comprises an audio information recorder system (AIRS) 102 coupled via communication network 104 to a plurality of communication devices 106 belonging to members of a group. AIRS 102 and communication devices 106 are coupled to communication network 104 via communication links 108. One or more information access devices 110 may also be coupled to AIRS 102 via communication links 108.

It should be understood that point-to-multipoint audio communication system 100 depicted in FIG. 1 is merely illustrative of an embodiment incorporating the present invention and does not limit the scope of the invention as recited in the claims. One of ordinary skill in the art would recognize other variations, modifications, and alternatives. For example, in alternative embodiments of the present invention, AIRS 102 may be incorporated as part of one of communication devices 106.

Communication network 104 provides a mechanism allowing communication devices 106 and AIRS 102 to communicate and receive audio and other information with/from each other. Communication network 104 may itself be comprised of many interconnected networks, base stations, signal repeaters, communication systems, or the like. Communication network 104 may be embodied as a wireless network, a switched network, a public network, the Internet, a local area network (LAN), a wide area network (WAN), an intranet, a private network, or any other network capable of facilitating point-to-multipoint communication of audio information, or combinations thereof.

Communication links 108 used to connect the various systems depicted in FIG. 1 may be of various types including hardwire links, optical links, satellite or other wireless communications links, wave propagation links, or any other mechanisms capable of communicating audio information. Various communication protocols may be used to facilitate communication of information via the communication links. These communication protocols may include wireless communication protocols such as wireless application protocol (WAP), TCP/IP protocols, HTTP protocols, protocols under development by industry standard organizations, vendor-specific protocols, customized protocols, and others.

Communication devices 106 enable members of a group that use point-to-multipoint audio communication system 100 to communicate audio information with one another. A user member may transmit and/or receive audio information using communication device 106. According to an embodiment of a point-to-multipoint audio communication system, the transmitted audio information is then simultaneously communicated to communication devices of other members of the group and to the AIRS 102 via communication network 104. Accordingly, in a point-to-multipoint audio communication system such as system 100 depicted in FIG. 1, audio information transmitted by a member of the group using the member's communication device may be simultaneously communicated to communication devices 106 of the other members of the group.

A communication device 106 may operate in various modes, for example, half-duplex mode, full duplex mode, and others. In half-duplex mode, a user can use the communication device to either listen to audio information (i.e., receive audio information) or transmit audio information, but not both. In full-duplex mode, a user can both listen to audio information and/or transmit audio information at the same time. Communication device 106 may be embodied as a walkie-talkie, a CB radio, a cellular telephone incorporating digital and/or analog technologies, a cellular telephone equipped with walkie-talkie capabilities (e.g., a Nextel phone with direct connect feature), a telephone, a data computing device, or any other device capable of transmitting and receiving audio information.

Communication devices 106 depicted in FIG. 1 may represent communication devices used by members of a group. For example, communication device 106-1 may correspond to a device used by a first member of the group, communication device 106-2 may correspond to a device used by a second member of the group, and so on. Communication device 106-n may correspond to a device used by an n$^{th}$ member of the group comprising "n" members. It should be understood that a group might comprise as few as two members.

Although FIG. 1 depicts communication devices used by members of a single group, it should be understood that communication devices used by users of one or more other groups may also be coupled to AIRS 102 via communication network 104. Accordingly, point-to-multipoint audio communication system 100 depicted in FIG. 1 may be used by multiple groups of users to communicate audio information. The number of users in each group may vary. For example, a first group of users may have five members, a second group of users may have fifteen members, and so on. Generally, a member of one group can communicate with other members of that group but cannot communicate with members of another group. It should however be understood that a user could be a member of multiple groups. In such a scenario, a particular communication device used by a user belonging to multiple groups may receive audio information transmitted by communication devices of the one or more groups to which the user belongs.

AIRS 102 is configured to unintrusively archive audio information communicated between members of a group according to the teachings of the present invention. According to an embodiment of the present invention, for a particular group, AIRS 102 is configured to monitor and record communications between communication devices belonging to members of the particular group. According to an embodiment of the present invention, AIRS 102 is configured to analyze the recorded audio information to identify one or more conversation portions in the audio information. A conversation portion corresponds to a portion of the recorded audio information in which there is communication between one or more members of a group. AIRS 102 may also be configured to determine the origination points of audio information in the conversation portions. For example, AIRS 102 may identify the identities of one or speakers involved in a conversation portion or AIRS 102 may identify one or more communication devices that were used to transmit audio information involved in a conversation portion. Audio information corresponding to the conversation portions is then archived by AIRS 102.

Users of the present invention can then retrieve the archived audio information. The users may include members of one or more groups, other users who may not be members of any group, and others. As described below, the archived information may be retrieved or accessed using various different techniques. According to an embodiment of the present invention, the archived information can be retrieved using information access devices 110 or using communication devices 106.

AIRS 102 may archive the recorded audio information in various different formats. According to an embodiment of the present invention, AIRS 102 is configured to transcribe the audio information corresponding to the conversation portions and store text transcripts corresponding to the conversation portions. The transcription may be performed automatically by AIRS 102, may be performed manually, or may be performed using combinations of manual and automatic techniques. The archived text transcripts of the audio information may then be retrieved by users of the present invention. The archived information may also be stored as audio files (e.g., MP3 format files, WAV format files, digital audio files, and other audio formats), web/multimedia pages, data structures comprising pointers to audio files, and others. The archived information is then available for retrieval by users of the present invention.

According to an embodiment of the present invention, AIRS 102 is configured to provide an access control system that regulates access to the archived audio information. Using the access control system, only those users who have the necessary access privileges are allowed to retrieve the archived information. For example, according to an embodiment of the present invention, AIRS 102 may be configured such that archived audio information corresponding to communications between members of a particular group can only be accessed by members of the particular group. In this embodiment, a user not belonging to the particular group is denied access to the archived audio information corresponding to communications between members of the particular group. In this embodiment, AIRS 102 may access information identifying the groups and members (e.g., name of members, information identifying communication devices used by the members, etc.) of the groups to implement the access control.

In alternative embodiments, AIRS 102 may be configured such that a user not belonging to the particular group may also be allowed to access archived information corresponding to the particular group. Various different access control mechanisms may be implemented to regulate access to the archived audio information.

Access rights may also be applied to members within a group. For example, for a particular group, a first member of the group may be allowed to access archived audio information originating from another member of the group only if the first member is authorized to access that information. For example, if an archived conversation portion included audio information originating from a second member of a group and a third member of the group, the first member of the group may be allowed to access the archived conversation portion only if the first member is permitted to access audio information originating from the second and third members. Various other access control mechanisms known to those skilled in the art may also be used by AIRS 102 to regulate access to the archived audio information.

According to an embodiment of the present invention, AIRS 102 may also be configured to broadcast audio information to communication devices used by members of a group at a pre-configured time or event. The time or event is user-configurable. A user of the point-to-multipoint audio communication system 100 may specify the audio information that is broadcast. Further details related to broadcasting of audio information are provided below.

As indicated above, users may use information access devices 110 to access audio information archived by AIRS 102. Information access devices 110 may include computer systems, telephones, facsimile machines, printers, copiers, and other devices that can be used to access information. For example, AIRS 102 may receive a request from an information access device 110 requesting a portion of the audio information archived by AIRS 102. Provided that the user requesting the information is allowed to access the requested archived information, AIRS 102 may then communicate the requested information to the information access device that sent the request. The information may be communicated to the information access device in various different formats. Examples of formats include email, attachments to emails, facsimile, audio files, web pages that may be displayed by a browser, audio messages (e.g., audio messages that can be accessed via a telephone), streaming media (e.g., streaming audio and/or video), and other formats.

In alternative embodiments, AIRS 102 may be configured to push the archived audio information or a portion thereof to users who have indicated an interest in receiving the information. For example, users interested in receiving portions of the archived information may register their interests with AIRS 102. Audio information archived by AIRS 102 and that is related to a user's interest may then be pushed to the user at periodic time intervals. As described above, the information may be output to the user via various information access devices in one or more formats.

According to an embodiment of the present invention, point-to-multipoint audio communication system 100 depicted in FIG. 1 may be embodied as a push-to-talk wireless system or a voice operated switch (VOX) system. It should be understood however that the present invention could be used with a wireline communication system, or a wireless communication system, or combinations of a wireline and wireless systems.

In a push-to-talk or VOX system, a single or dedicated communication channel (also referred to as the "broadcast channel") is used to facilitate communications between communication devices used by members of a group. The broadcast channel may comprise a single channel or frequency, or a group of frequencies or individual channels managed by a controller to simulate a single channel. According to one embodiment of a push-to-talk or VOX system, only one user is allowed to transmit audio information over the broadcast channel at any given time. In other words, only one speaker of a group may speak at any given time. However, all other members of a group can listen to the broadcast channel to receive communications from the single user who is transmitting. A user desiring to transmit audio information generally sends a broadcast channel access request by depressing a push-to-talk button or by activating a VOX switch on the user's communication device requesting access to the broadcast channel. Upon receiving access to the broadcast channel, the audio information transmitted by the user is then simultaneously communicated to other members of the group over the broadcast channel.

In alternative embodiments, more than one user may be allowed to transmit audio information over the broadcast channel at any given time. However, if multiple users transmit at the same time then interference can occur resulting in an unintelligible audio signal. Various arbitration systems known to those skilled in the art may be used to prevent such interference.

Figure 2:
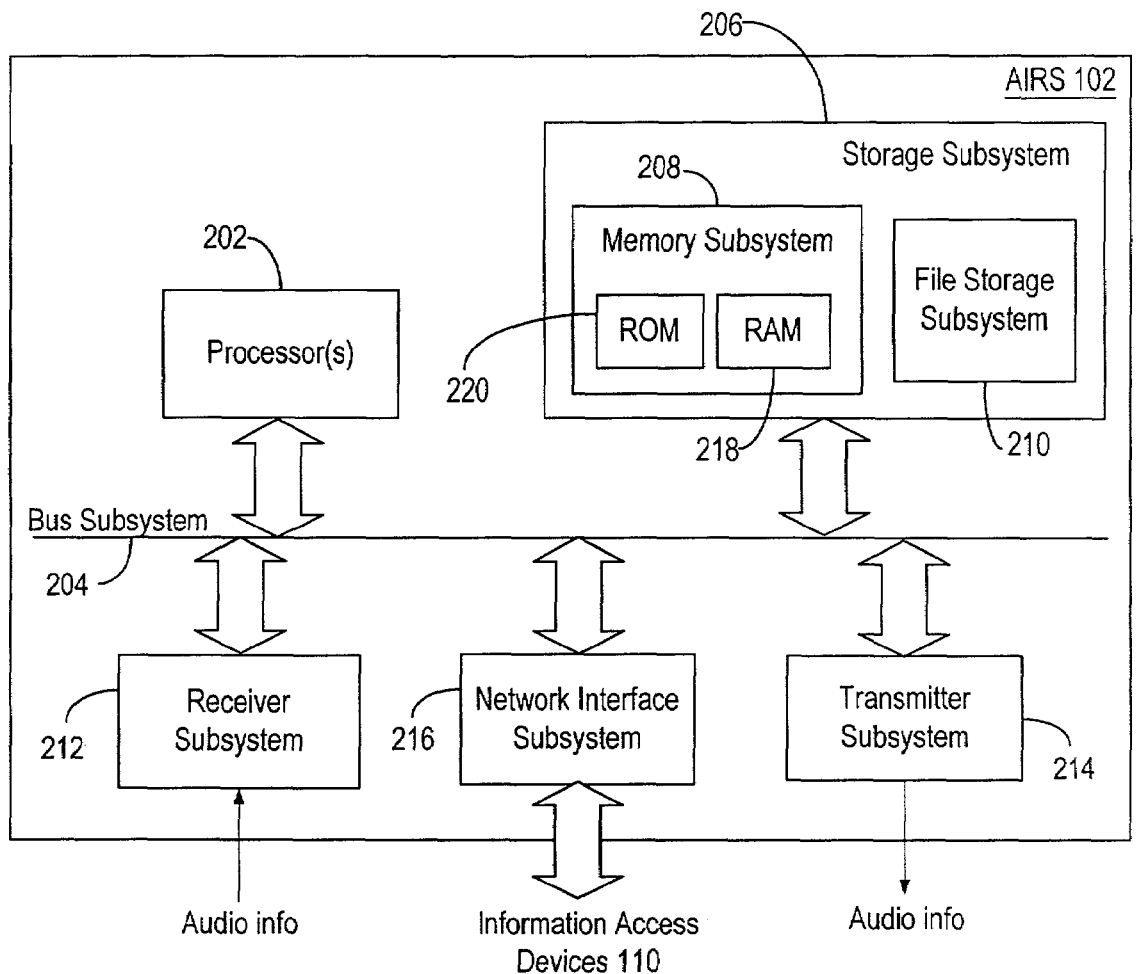
FIG. 2 is a simplified block diagram of an audio information recorder system according to an embodiment of the present invention.

FIG. 2 is a simplified block diagram of an AIRS 102 according to an embodiment of the present invention. As shown in FIG. 2, AIRS 102 includes at least one processor 202 that communicates with a number of peripheral devices via a bus subsystem 204. These peripheral devices may include a storage subsystem 206, comprising a memory subsystem 208 and a file storage subsystem 210, a receiver subsystem 212, a transmitter subsystem 214, and a network interface subsystem 216. AIRS 102 may also comprise user interface input and output systems (not shown) that allow user interaction with AIRS 102. A user may be a human user, a device, a process, another computer, or the like.

Bus subsystem 204 provides a mechanism for letting the various components and subsystems of AIRS 102 to communicate with each other as intended. Although bus subsystem 204 is shown schematically as a single bus, alternative embodiments of the bus subsystem may utilize multiple buses.

Storage subsystem 206 may be configured to store the basic programming and data constructs that provide the functionality of the present invention. For example, software modules implementing the functionality of the present invention may be stored in storage subsystem 206 of AIRS 102. These software modules may be executed by processor(s) 202 of AIRS 102. Storage subsystem 206 may also provide a repository for storing various databases, files, tables, and other information that may be used by the present invention. For example, audio information archived by AIRS 102 may be stored in storage subsystem 206. Alternatively, the archived information may be stored in a memory location accessible to AIRS 102. Storage subsystem 206 may comprise memory subsystem 208 and file storage subsystem 210.

Memory subsystem 208 may include a number of memories including a main random access memory (RAM) 218 for storage of instructions and data during program execution and a read only memory (ROM) 220 in which fixed instructions are stored. File storage subsystem 210 provides persistent (non-volatile) storage for program and data files, and may include a hard disk drive, a floppy disk drive along with associated removable media, a Compact Disk Read Only Memory (CD-ROM) drive, an optical drive, removable media cartridges, or other like storage media. One or more of the drives may be located at remote locations on other connected computers.

Network interface subsystem 216 provides an interface to external systems and devices such as information access devices 110. According to an embodiment of the present invention, network interface subsystem 216 facilitates communication of information to and from information access devices 110. Embodiments of network interface subsystem 216 include an Ethernet card, a modem (telephone, satellite, cable, ISDN, etc.), (asynchronous) digital subscriber line (DSL) units, or the like.

Receiver subsystem 212 is configured to receive audio information. For example, receiver subsystem 212 is configured to receive audio information communicated using communication devices 106. Transmitter subsystem 214 is configured to transmit audio information. For example, transmitter subsystem 214 is configured to transmit audio information from AIRS 102 to communication devices used by group members.

AIRS 102 itself can be of varying types including a personal computer, a portable computer, a workstation, a computer terminal, a network computer, a mainframe, a kiosk, a personal digital assistant (PDA), a communication device such as a cell phone, a game controller, a walkie-talkie, a CB radio, or any other data processing system. The description of AIRS 102 depicted in FIG. 2 is intended only as a specific example for purposes of illustrating the preferred embodiment of the computer system. Many other configurations of AIRS 102 are possible having more or fewer components than the system depicted in FIG. 2. For example, various types of processors are contemplated, such as the Athlon™ class microprocessors from AMD, the Pentium™-class or Celeron™-class microprocessors from Intel Corporation, PowerPC™ G3 or G4 microprocessors from Motorola, Inc., Crusoe™ processors from Transmeta, Inc. and the like. Further, various types of operating systems are contemplated in embodiments of AIRS 102 including WindowsNT™ from Microsoft, Solaris from Sun Microsystems, LINUX, UNIX, MAC OS X from Apple Computer Corporation, BeOS™, and the like.

Figure 3:
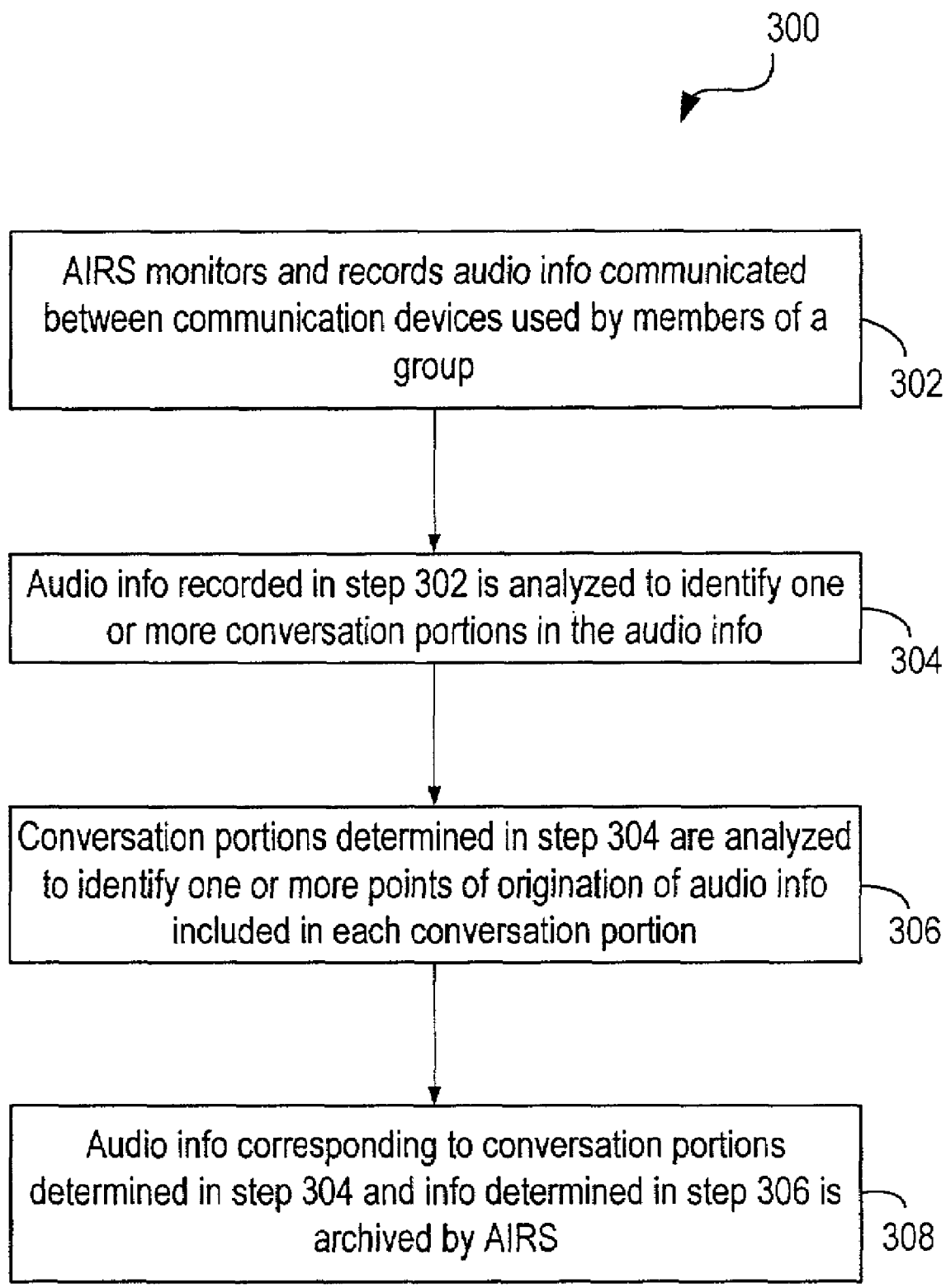
FIG. 3 is a simplified high-level flowchart depicting a method of archiving audio information communicated between members of a group according to an embodiment of the present invention.

FIG. 3 is a simplified high-level flowchart 300 depicting a method of archiving audio information communicated between members of a group according to an embodiment of the present invention. The method may be performed by AIRS 102, or by AIRS 102 in association with other data processing systems. In the embodiment described below the method is performed by AIRS 102. The method may be performed by software modules executed by processor(s) 202 of AIRS 102, or by hardware modules coupled to AIRS 102, or combinations thereof. Flowchart 300 depicted in FIG. 3 is merely illustrative of an embodiment incorporating the present invention and does not limit the scope of the invention as recited in the claims. One of ordinary skill in the art would recognize variations, modifications, and alternatives.

As depicted in FIG. 3, AIRS 102 monitors and records audio information communicated between communication devices used by members of a group (step 302). According to an embodiment of the present invention, AIRS 102 continuously monitors and records communications between communication devices of the group. In alternative embodiments, AIRS 102 may be configured to monitor and record audio information communicated between the communication devices for a period of time specified by a user of the present invention. For example, AIRS 102 may be configured to monitor communications between 9:00 am and 6:00 pm, or the like.

According to an embodiment of the present invention, AIRS 102 is able to identify communications as originating from communication devices used by members of a particular group based upon information identifying the devices included in the communicated audio information and based upon group identification information accessible to AIRS 102. Each communication device typically has a device identifier associated with it that uniquely identifies the communication device. When audio information is transmitted using a particular communication device, the device identifier of the particular communication device is also included in the transmitted audio information. Upon receiving audio information transmitted from a communication device, AIRS 102 is configured to extract the device identifier from the audio information. The device identifier uniquely identifies the communication device that was the point of origination of the transmitted audio information.

Various other techniques known to those skilled in the art may also be used to identify points of origination of the audio information. For example, according to an embodiment of the present invention, the point of origination of transmitted audio information (e.g., the communication device used for communication the information) may be determined based upon other information, such as geographical location of the transmitted information, associated with the audio transmission.

In yet other embodiments, voice recognition techniques may be applied to the transmitted audio information to determine the identities of one or more speakers transmitting the information. The communication devices that transmitted the information (or points of origination of the audio information) may be determined based upon the identities of the speakers. In this embodiment, AIRS 102 may have access to information mapping speaker identifiers to communication devices.

The group identification information accessible to AIRS 102 identifies one or more groups whose communications may be monitored and recorded by AIRS 102. For each group, the group identification information may include information identifying device identifiers of communication devices used by members of the group. Accordingly, upon determining a device identifier from the audio information received by AIRS 102, AIRS 102 can determine the identity of the communication device that transmitted the audio information, and determine a group to which the originating communication device belongs based upon the group identification information. It should be understood that AIRS 102 can simultaneously monitor and archive audio information for a single group or for multiple groups.

The audio information recorded in step 302 is then analyzed to identify one or more conversation portions in the audio information (step 304). A conversation portion corresponds to a portion of the recorded audio information in which there is communication between one or more members of the group. AIRS 102 may use various different techniques to identify conversation portions from the audio information recorded for a group.

Figure 4:
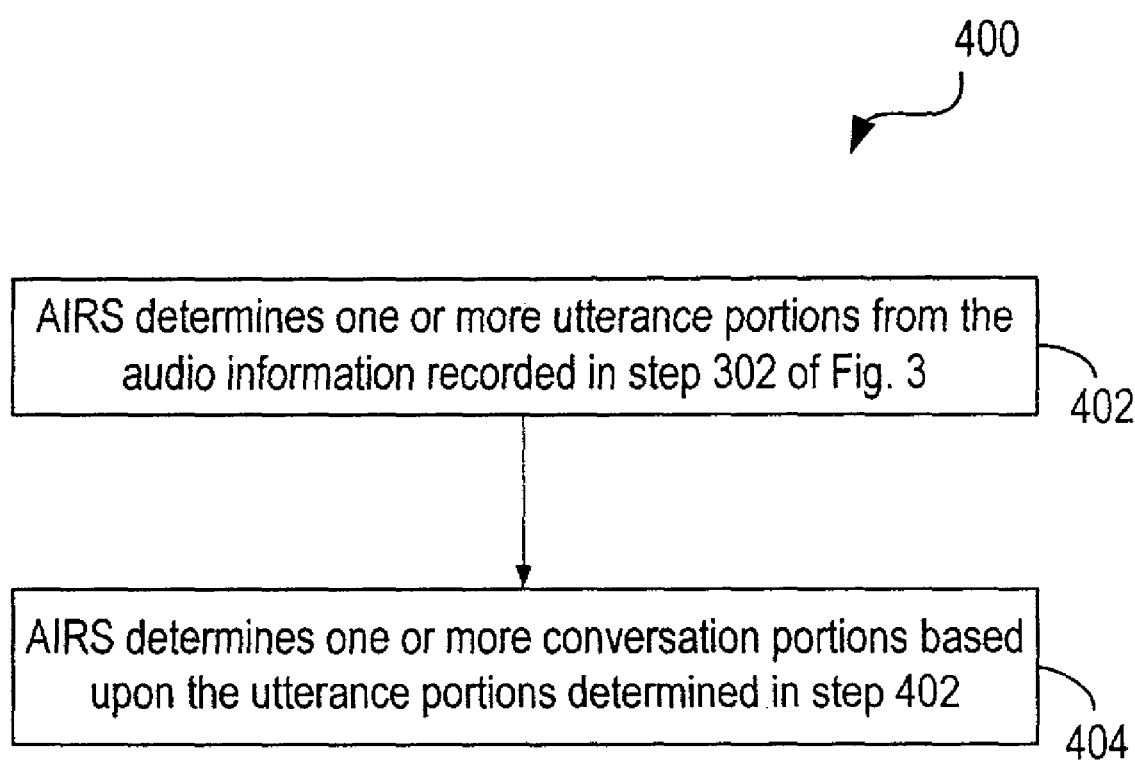
FIG. 4 is a simplified high-level flowchart depicting a method of identifying conversation portions from the recorded audio information according to an embodiment of the present invention.

FIG. 4 is a simplified high-level flowchart 400 depicting a method of identifying conversation portions from the recorded audio information according to an embodiment of the present invention. The method may be performed by AIRS 102 or by AIRS 102 in association with other computer systems. In the embodiment described below, the method is performed by AIRS 102. The method may be performed by software modules executed by processor(s) 202 of AIRS 102, or by hardware modules coupled to AIRS 102, or combinations thereof. Flowchart 400 depicted in FIG. 4 is merely illustrative of an embodiment incorporating the present invention and does not limit the scope of the invention as recited in the claims. One of ordinary skill in the art would recognize variations, modifications, and alternatives.

As depicted in FIG. 4, AIRS 102 determines one or more utterance portions from the audio information recorded in step 302 of FIG. 3 (step 402). An utterance portion is a portion of the recorded audio information that satisfies certain conditions that may be specified by the user. Each utterance portion is characterized by a start point and an end point. Accordingly, in step 302, the audio information recorded in step 302 is analyzed to identify an utterance start point followed by an utterance end point (which determines the length of an utterance portion), followed by the next utterance start point and so on.

According to an embodiment of the present invention, an utterance start point is determined when the average amplitude of the recorded audio signal goes and remains over a threshold amplitude level (referred to as the "utterance start threshold value") for a specific period of time (referred to as the "utterance start time interval"). The utterance start threshold value and the utterance start time interval values are user configurable. According to an embodiment of the present invention, the utterance start time interval is set to ½ second. The thresholds may also be set to other values.

According to an embodiment of the present invention, the average amplitude of a signal is the integral of the amplitude of the signal over some time window divided by size of the time window. According to an embodiment of the present invention, a sliding window of approximately 0.1 seconds. Several techniques known to those skilled in the art may be used to determine the average amplitude of a signal. For example, a number of well-known techniques for determining the power of a signal in the presence of noise may be used for determining the average amplitude.

Upon detecting an utterance start point, AIRS 102 then analyzes the recorded audio information to determine an utterance end point. According to an embodiment of the present invention, an utterance end point is determined when the average amplitude of the recorded audio signal goes below a threshold amplitude level (referred to as the "utterance end threshold value") for at least a specified period of time (referred to as the "utterance end time interval"). The utterance end threshold value and the utterance end time interval values are user configurable. According to an embodiment of the present invention, the utterance end time interval is set to 3 seconds. The thresholds may also be set to other values. The utterance end point may also correspond to a portion of the audio information when a new communication device transmits audio information.

The utterance start point and the following utterance end point demarcate the length of an utterance portion. Upon detecting an utterance end point, AIRS 102 then analyzes the recorded audio information to determine the next utterance start point, and the process is repeated for the entire audio information recorded in step 302 of FIG. 3. In this manner, one or more utterance portions (or utterances) are determined in step 402 for the recorded audio information.

The embodiment of the present invention described above uses the average amplitude of the audio signal to determine utterance portions. However, in alternative embodiments of the present invention, other characteristics of the audio signal may also be used to determine utterance portions.

AIRS 102 then determines one or more conversation portions based upon the utterance portions determined in step 402 (step 404). According to an embodiment of the present invention, a conversation portion is a portion of the recorded audio information comprising one or more utterance portions wherein the time interval or gap between any two successive or adjacent utterance portions is no greater than a specified time interval (referred to as the "conversation time interval"). The conversation time interval value is user configurable. According to an embodiment of the present invention, the conversation time interval value is set to 3 minutes. The time interval may also be set to other values.

Accordingly, in step 404, AIRS 102 determines one or more conversation portions from the recorded audio information. Each conversation portion may include one or more utterance portions. The start point of a conversation portion corresponds to the start time of the first utterance (in chronological order) included in the conversation portion, and the end point of the conversation portion corresponds to the end time of the last utterance portion included in the conversation portion.

It should be understood that the method depicted in FIG. 4 is merely illustrative of one technique for determining conversation portions. Various other techniques may also be used according to the teachings of the present invention.

Referring back to FIG. 3, after one or more conversation portions have been identified, AIRS 102 then analyzes the audio information included in the conversation portions to identify one or more points of origination of audio information included in each conversation portion (step 306). As described above, according to an embodiment of the present invention, AIRS 102 determines a point of origination for transmitted audio information based upon device identification information included in the transmitted audio information. Accordingly, for each conversation portion determined in step 304, AIRS 102 identifies one or more points of origination for audio information included in the conversation portion. For each point of origination AIRS 102 also determines a portion of the conversation portion attributable to the point of origination. For example, if three users of a group transmitted audio information during a conversation portion, AIRS 102 determines the identity of the three communication devices that were used to transmit the information, and determines portions of the conversation portion that were transmitted by each communication device. As described above, various other techniques may also be used to determine points of origination of the audio information.

According to an embodiment of the present invention, based upon the communication device identifiers extracted from the audio information included in a conversation portion, AIRS 102 may determine information about users of the communication devices. For example, AIRS 102 may have access information mapping device identifiers to user names (e.g., group identification information) and other information related to the users. Given a particular communication device identifier, AIRS 102 can then determine information about the user (e.g. user name, photograph of the user, etc.) of the communication device identified by the particular device identifier. Other techniques (e.g. voice recognition techniques) may also be used to determine information related to users of the communication devices. In this manner, as part of step 306, AIRS 102 may determine the identity of one or more speakers that transmitted audio information included in a conversation portion. Various other types of information may also be extracted from the conversation portions in step 306.

AIRS 102 then archives audio information related to the conversation portions determined in step 304 and other information determined in step 306 (step 308). The archived information may include audio information corresponding to the conversation portions, information determined in step 306, and other information related to the conversation portions. The information may be archived in various different forms. According to an embodiment of the present invention, audio information corresponding to each conversation portion is transcribed. A text transcript is generated for each conversation portion and archived. The text transcript for a conversation portion may include information identifying one or more points of origination of audio information in the conversation portion and audio information attributable to the one or more points of origination. If AIRS 102 is able to determine speakers/users corresponding to the points of origination, then the text transcript may also include information identifying the speakers. Other information related to the speakers, such as the speaker's photograph, the speaker's address, phone number, etc. may also be included in the text transcript generated for a conversation portion. As previously stated, the transcription may be performed automatically by AIRS 102, or may be performed manually, or may be performed using combinations of manual and automatic techniques.

The audio information corresponding to a conversation portion may also be stored as audio files (e.g., MP3 format files, WAV format files, etc.). AIRS 102 may also create multimedia web pages that store or provide links to audio and other information for one or more conversation portions. Accordingly, the recorded audio information may be archived in one of a plurality of different formats. According to an embodiment of the present invention, the format to be used for archiving the recorded audio information may be specified by a user of the present invention. After the audio information has been archived, it is then available to be retrieved by a user of the present invention.

It should be understood that steps 304, 306, and 308 may be performed in parallel with step 302. For example, previously recorded audio information for a group may be analyzed according to steps 304, 306, and 308 while additional audio information for the group is being recorded by AIRS 102 according to step 302.

As indicated above, audio information archived by AIRS 102 may be retrieved by users using information access devices 110, by using communication devices 106, or other devices. Information access devices may include computer systems, telephones, facsimile machines, printers, copiers, and other devices that may be used to access information.

According to an embodiment of the present invention, the archived information is communicated to a user in response to an information request received by AIRS 102 from an information access device or communication device used by the user. The information request may include information specified by the requesting user identifying one or more portions of the archived information (e.g., one or more conversation portions) that the user wishes to retrieve. According to an embodiment of the present invention, the conversation portions to be retrieved may be identified by conversation identifiers assigned to the conversation portions. The user may also request audio information corresponding to communications for a particular group that occurred during a user-specified time period. For example, the information request may request audio information corresponding to communications for a group that occurred between 1:00 pm and 3:00 pm on Feb. 12, 2002. The user may also request audio information corresponding to conversations in which a particular member transmitted audio information (i.e., conversations in which a particular user spoke). Various other criteria may also be specified for identifying audio information to be communicated to the user.

In alternative embodiments, AIRS 102 may be configured to push the archived audio information (or portions thereof) to one or more users who have indicated an interest in receiving the information or who have registered to receive the information. In this embodiment, a user may be allowed to specify criteria identifying information that the user is interested in and wishes to receive from AIRS 102. For example, a user may indicate an interest in receiving audio information corresponding to conversation portions involving a particular group of users. Audio information archived by AIRS 102 that is related to the user's interest is then pushed to the user at periodic time intervals. As described above, various difference techniques may be used to push the information to the users. For example, the information may be sent to the user via emails. In this embodiment, AIRS 102 may maintain a mailing list identifying users to whom the archived information is to be communicated at regular time intervals.

According to an embodiment of the present invention, for a group of users whose audio information is being monitored and archived by AIRS 102, AIRS 102 is configured to detect when a particular member of the group "misses" one or more conversations communicated between other members of the group. According to an embodiment of the present invention, AIRS 102 is configured to detect when a communication device used by a group member is switched on or off. When AIRS 102 detects that a particular communication device 106 used by a group member has been turned off, then all conversations that occur during the time period when the particular communication device is turned off are tagged as having been missed by the user of the particular communication device. In this embodiment, AIRS 102 may also classify a particular communication device as being turned off if AIRS 102 does not receive any audio information originating from the particular communication device for a period of time (i.e., the user of the communication device has been silent for a period of time). All conversations that occur during the time period when the particular communication device is classified as being turned off are tagged as having been missed by the user of the particular "silent" communication device.

When AIRS 102 detects that a particular communication device that was previously detected as being turned off has been turned on, or when AIRS 102 receives audio information from a previously "silent" communication device, AIRS 102 may prompt the user regarding the missed conversations and allow the user to retrieve the missed conversations. According to an embodiment of the present invention, AIRS 102 executes an interactive voice response (IVR) application that prompts the user and allows the user of the particular communication device to retrieve one or more missed conversations. For example, a voice prompt such as "You have missed the last 'n' conversations. Would you like to listen to the missed conversations?" may be communicated to the particular communication device. The user of the particular communication device may then control playback of the missed conversation portions using prompts and options provided by the IVR system. Per the user's selection, one or more conversations may then be played back to the user via the particular communication device. According to an embodiment of the present invention, the missed conversations are played back only when there are no other live communications occurring between members of the group.

Various formats may be used to communicate the archived information to a user. These formats include email, a web page, a text file, a facsimile, an audio file, or the like. The archived information communicated to the user may be presented to the user using various different interfaces. For example, if the information is retrieved using a telephone, then an audio signal corresponding to the archived information requested by the user is output to the user via the telephone's speaker. AIRS 102 may execute an IVR system allowing the user to control playback of the requested information. Various other interfaces may also be used to output the archived information to the user.

As indicated above, according to an embodiment of the present invention, the archived information requested by a user may be communicated to the user in the form of a web page generated by AIRS 102 that comprises links to the archived information (or portions thereof). The user using an application program such as a browser program may then access the web page containing links to the archived information.

FIGS. 5A, 5B, 5C, 5D, and 5E depict various simplified interfaces for presenting the archived audio information to a user according to embodiments of the present invention. It should be understood that the interfaces depicted in FIGS. 5A, 5B, 5C, 5D, and 5E merely illustrative embodiments incorporating the present invention and do not limit the scope of the invention as recited in the claims. One of ordinary skill in the art would recognize other variations, modifications, and alternatives.

Figure 5A:
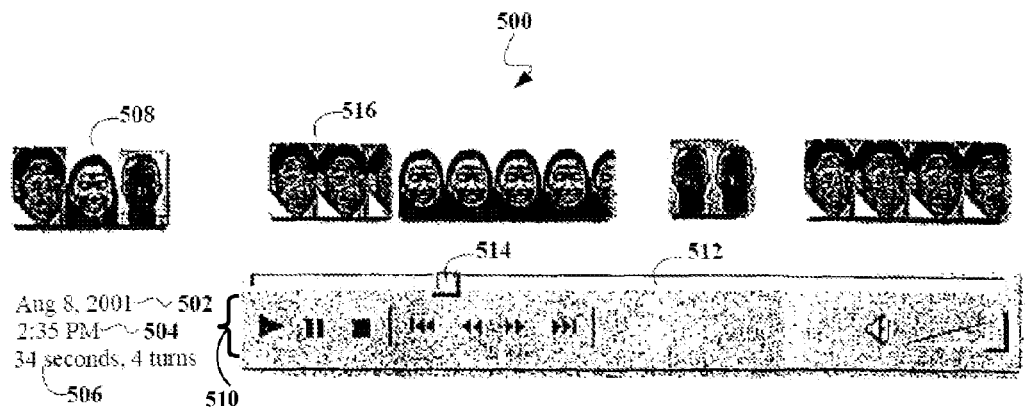
FIGS. 5A, 5B, 5C, 5D, and 5E depict various simplified interfaces for presenting the archived audio information to a user according to an embodiment of the present invention.

FIG. 5A depicts a simplified interface 500 for outputting archived information related to a conversation to a user according to an embodiment of the present invention. As depicted in FIG. 5A, information indicating the date 502 and time 504 when the conversation portion displayed by interface 500 was recorded is displayed on the interface. The length of the conversation 506 and images 508 of the points of origin (or speakers) in the conversation are also displayed.

Interface 500 also displays a control bar 510 for controlling playback of the conversation. Control bar 510 comprises several well-known controls (e.g., Play, Pause, Stop, Rewind-to-start, Rewind, Forward, Forward-to-end, volume control) that can be selected by the user to control playback of audio information corresponding to the conversation. An audio gauge 512 and a progress puck 514 are also displayed. The length of audio gauge 512 represents the total length of the conversation. As the audio information is played back, puck 514 moves along audio gauge 512 indicating the current position of the audio information in the conversation being played back. The user may manually change the location of the audio information in the conversation being played back by repositioning puck 514 along audio gauge 512. Images 516 of speakers (or points of origination) involved in the conversation are displayed alongside audio gauge corresponding to portions of the conversation attributable to the speakers displayed in the images.

Figure 5B:
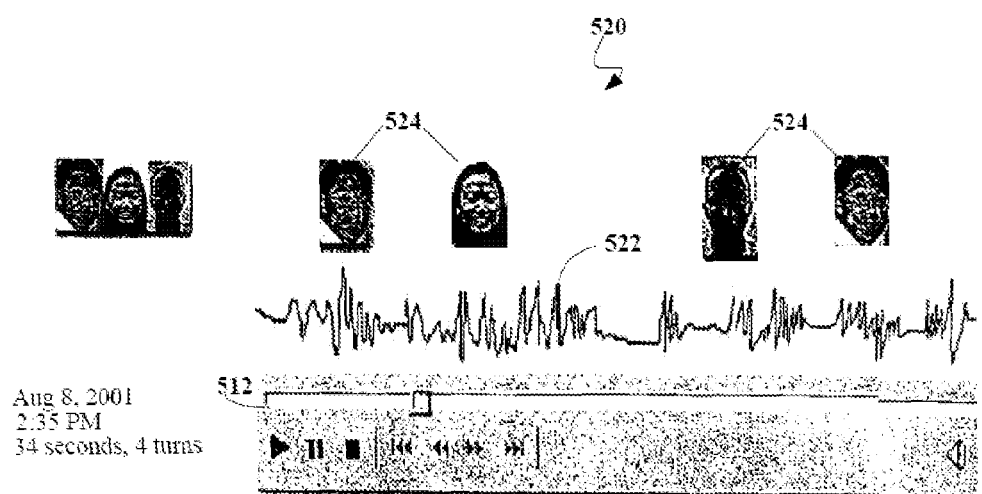

In interface 520 depicted in FIG. 5B, an audio voice pattern signal 522 corresponding to the audio information in the conversation is displayed alongside audio gauge 512. Images 524 of speakers involved in the conversation are displayed alongside the audio voice pattern signal marking start points of portions of the conversation attributable to the speakers displayed in the images.

Figure 5C:
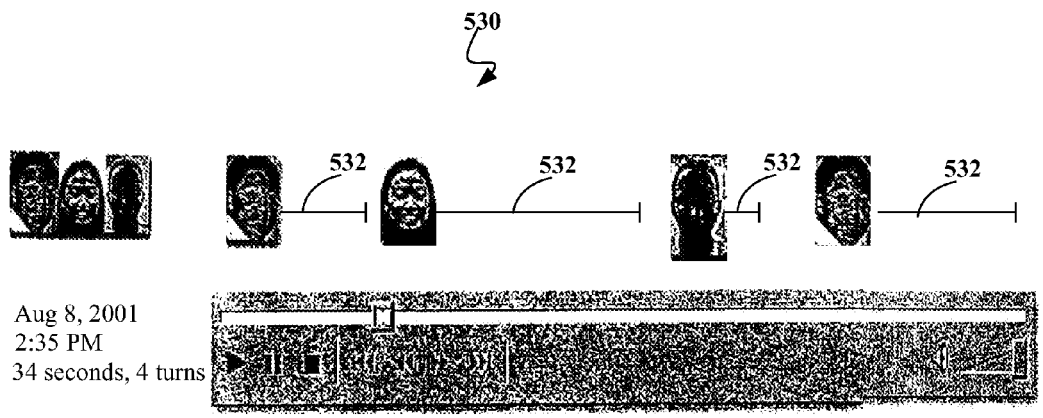
Figure 5D:
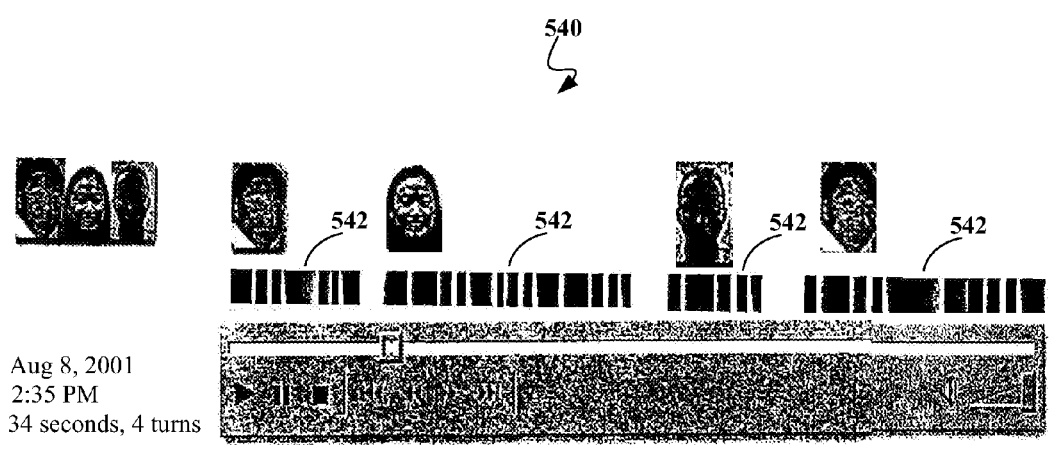

In interface 530 displayed in FIG. 5C, a line 532 is drawn to indicate the extent of a portion of the conversation attributable to a speaker (or point of origination). In interface 540 displayed in FIG. 5D, a voice pattern 542 is displayed to indicate the extent of a portion of the conversation attributable to a speaker (or point of origination).

Figure 5E:
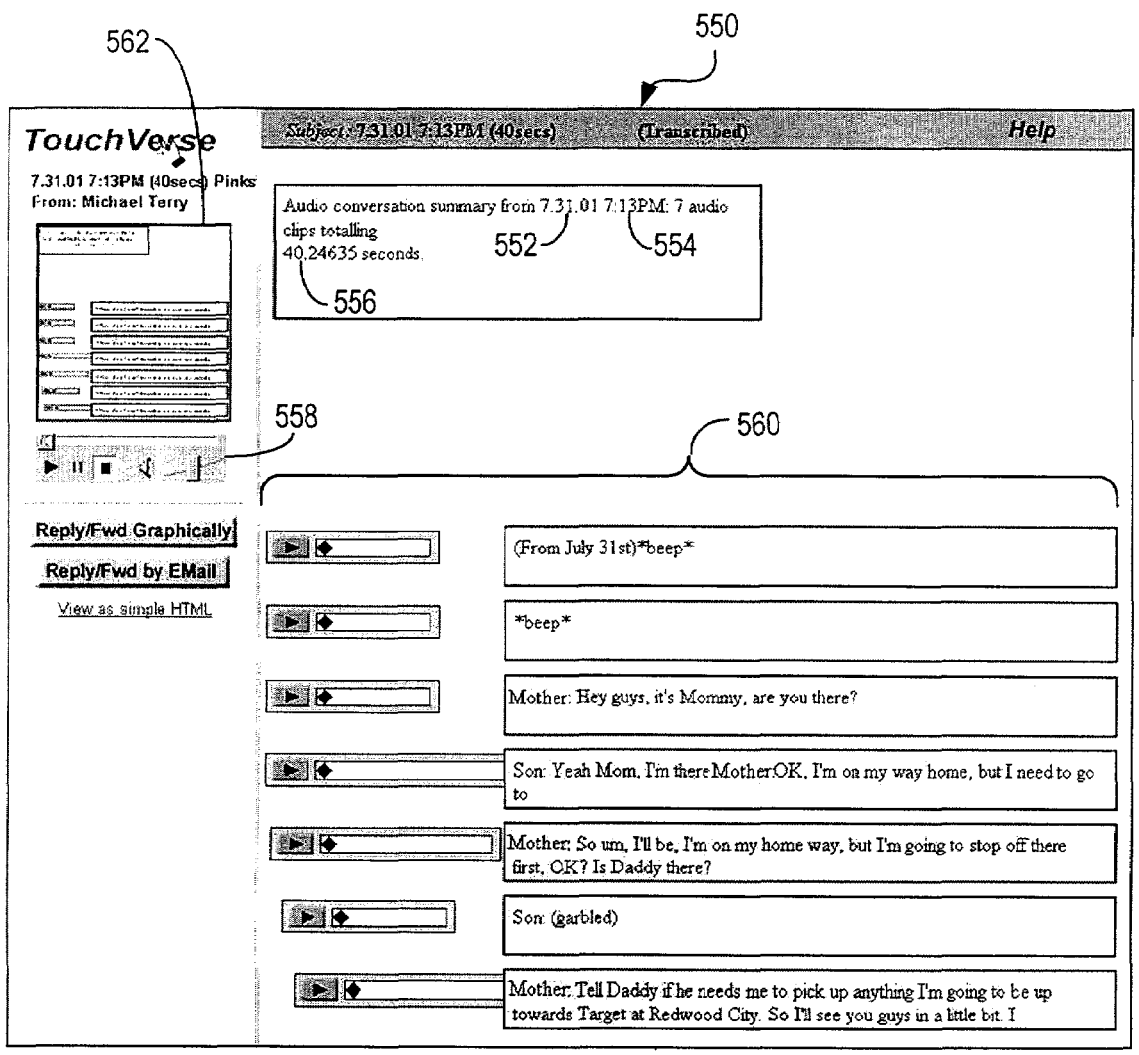

FIG. 5E depicts another interface 550 for outputting archived audio information to the user. A text transcript of the audio information is output to the user in interface 550. As depicted in FIG. 5E, the date 552 and time 554 when the conversation portion displayed by interface 550 was recorded is displayed. The length of the conversation 556 is also displayed. A control bar 558 comprises several well-known user-selectable controls for controlling playback of the audio information is displayed. A text transcript of the audio information is displayed in area 560 of user interface 550. The text transcript includes information identifying the various points of origination (e.g., Mother, Son) of audio information included in the conversation portion. An overview image 562 of area 560 is also displayed.

Various other interfaces may also be used to output the archived audio information to a user. Examples of such user interfaces are described in U.S. Non-Provisional application Ser. No. 09/407,010, entitled "METHOD & APPARATUS FOR GENERATING VISUAL REPRESENTATIONS FOR AUDIO DOCUMENTS" filed Sep. 28, 1999, the entire contents of which are herein incorporated by reference for all purposes.

As indicated above, according to an embodiment of the present invention, AIRS 102 may implement an access control mechanism that regulates access to the audio information archived by AIRS 102. In this embodiment, only those users who have the necessary access privileges are allowed to retrieve the archived information. For example, according to an embodiment of the present invention, AIRS 102 may be configured such that only members of a group can access archived audio information corresponding to communications between members of the group. In this setup, a member of a first group is denied access to archived information corresponding to communications between members of a second group. In other embodiments, the access control mechanism may also be set up such that a member of one group can access archived audio information corresponding to communications between members of another group. Privileges, access rights information, and other information used by AIRS 102 to implement the access control system may be stored in a memory location accessible to AIRS 102.

According to an embodiment of the present invention, access may also be regulated between members of a particular group. For example, a first member of a group may be allowed to access archived audio information originating from another member of the group only if the first member is specifically authorized to access that information. In this embodiment, if a group member requests archived audio information corresponding to communications between members of the group, then only that portion of the archived information, which the requesting group member is allowed to access, is communicated to the requesting member. Various other access control mechanisms known to those skilled in the art may also be used by AIRS 102 to regulate access to the archived audio information.

According to an embodiment of the present invention, communication devices 106 may provide features allowing users of the communication devices to regulate or control access to archived audio information originating from the communication devices. For example, a tri-state switch may be provided on a communication device 106 that allows a user of the communication device to control access to audio information originating from the communication device and archived by AIRS 102.

According to an embodiment of the present invention, AIRS 102 may be configured to deny all users access to any audio information originating from the communication device and archived by AIRS 102 when the tri-state switch on the communication device is set to a first state. Only members of a particular group to which the user belongs may be allowed to access information originating from the communication device and archived by AIRS 102 when the tri-state switch on the communication device is set to a second state. All users, irrespective of the groups to which the users belong, may be allowed to access information originating from the communication device and archived by AIRS 102 when the tri-state switch on the communication device is set to a third state. Accordingly, by setting the tri-switch to the first, second, or third state, the user of the communication device can control access to audio information originating from the communication device and archived by AIRS 102. Information identifying the state of the tri-state switch on a communication device may be broadcast along with the audio information transmitted by the communication device. It should be understood that various other features may also be provided on a communication device that allow a user of the communication device to control access to information originating from the communication device and archived by AIRS 102.

Figure 6:
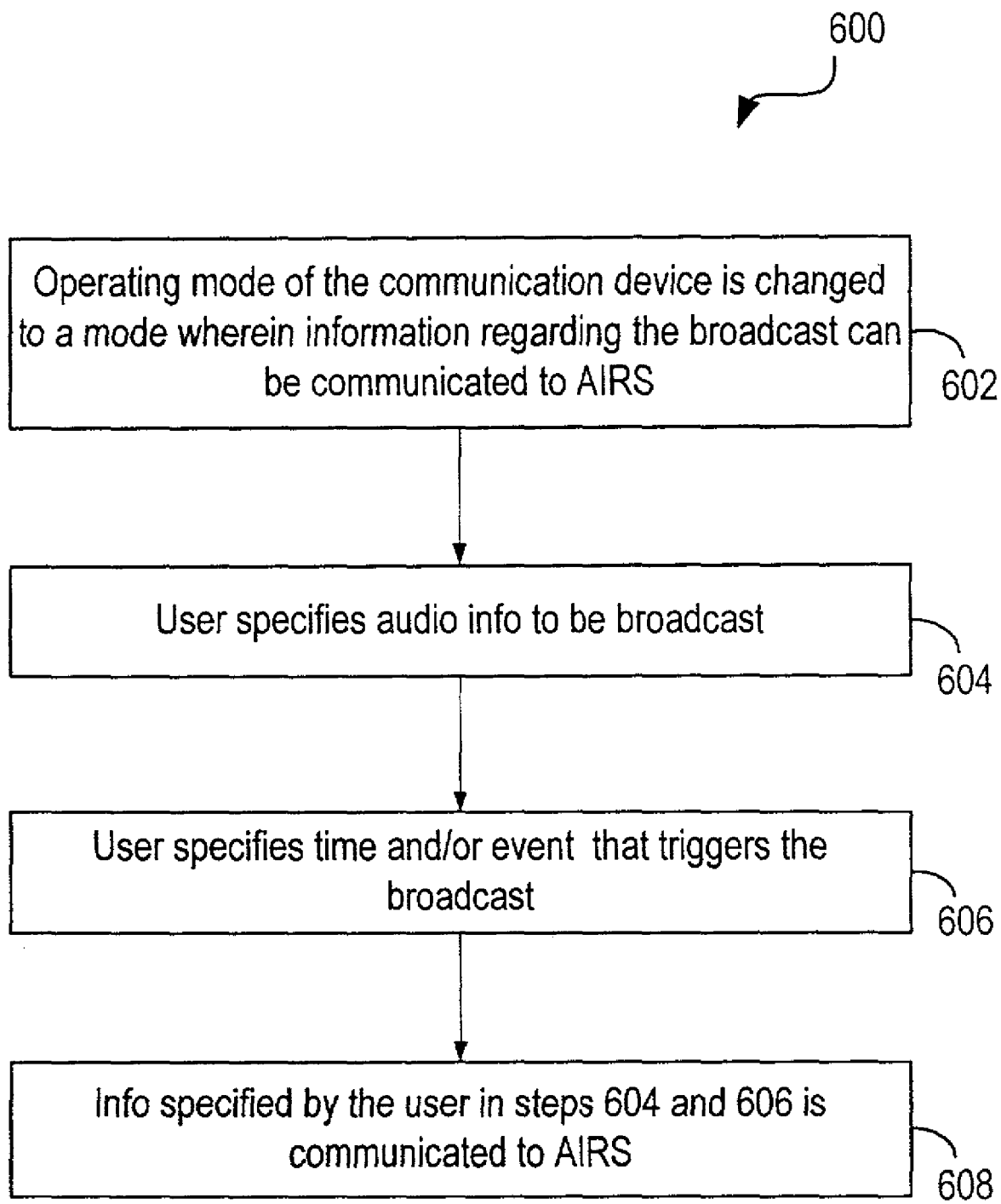
FIG. 6 is a simplified high-level flowchart depicting a method performed by a user of a communication device to configure an audio information recorder system to broadcast information according to an embodiment of the present invention.

According to an embodiment of the present invention, AIRS 102 may be configured to broadcast archived audio information to members of a group at a particular time or upon the occurrence of a particular event. The archived audio information to be broadcast and the event(s) and/or time when the audio information is to be broadcast may be configured by a user of the present invention. FIG. 6 is a simplified high-level flowchart 600 depicting processing performed to configure AIRS 102 to broadcast information according to an embodiment of the present invention. Flowchart 600 depicted in FIG. 6 is merely illustrative of an embodiment incorporating the present invention and does not limit the scope of the invention as recited in the claims. One of ordinary skill in the art would recognize variations, modifications, and alternatives.

As depicted in FIG. 6, the user first changes the operating mode of the communication device to a mode wherein information regarding the broadcast can be communicated to AIRS 102 (step 602). According to an embodiment of the present invention, one or more buttons (or switches, etc.) may be provided on a communication device that allow a user of the communication device to enter the mode wherein information regarding the broadcast can be communicated to AIRS 102.

The user then specifies the audio information that is to be broadcast (step 604). The audio information may be selected from audio information archived by AIRS 102. For example, the user may identify one or more conversation portions archived by AIRS 102 to be broadcast. The user may also specify that the next conversation that will be archived by AIRS 102 for a particular group is to be broadcast, or that a previous conversation archived by AIRS 102 for a particular group is to be broadcast, or the like. Alternatively, the user may provide or record the audio information that is to be broadcast.

The user then specifies the time when the audio information specified in step 604 is to be broadcast to members of the group, and/or an event(s) upon the occurrence of which the information specified in step 604 is to be broadcast (step 606). For example, the user may specify that the information is to be broadcast the next day at 8:00 am in the morning. The event specified in step 606 may correspond to any event that can be detected by AIRS 102. For example, the user may specify that the information specified in step 604 is to be broadcast when a particular group member's communication device is switched on. The information specified by the user in steps 604 and 606 is then communicated to AIRS 102 (step 608).

Upon receiving broadcast information configured by a user, AIRS 102 broadcasts the user specified audio information to all communication devices used by members of a group at the time specified by the user or upon the occurrence of an event specified by the user.

Figure 7:
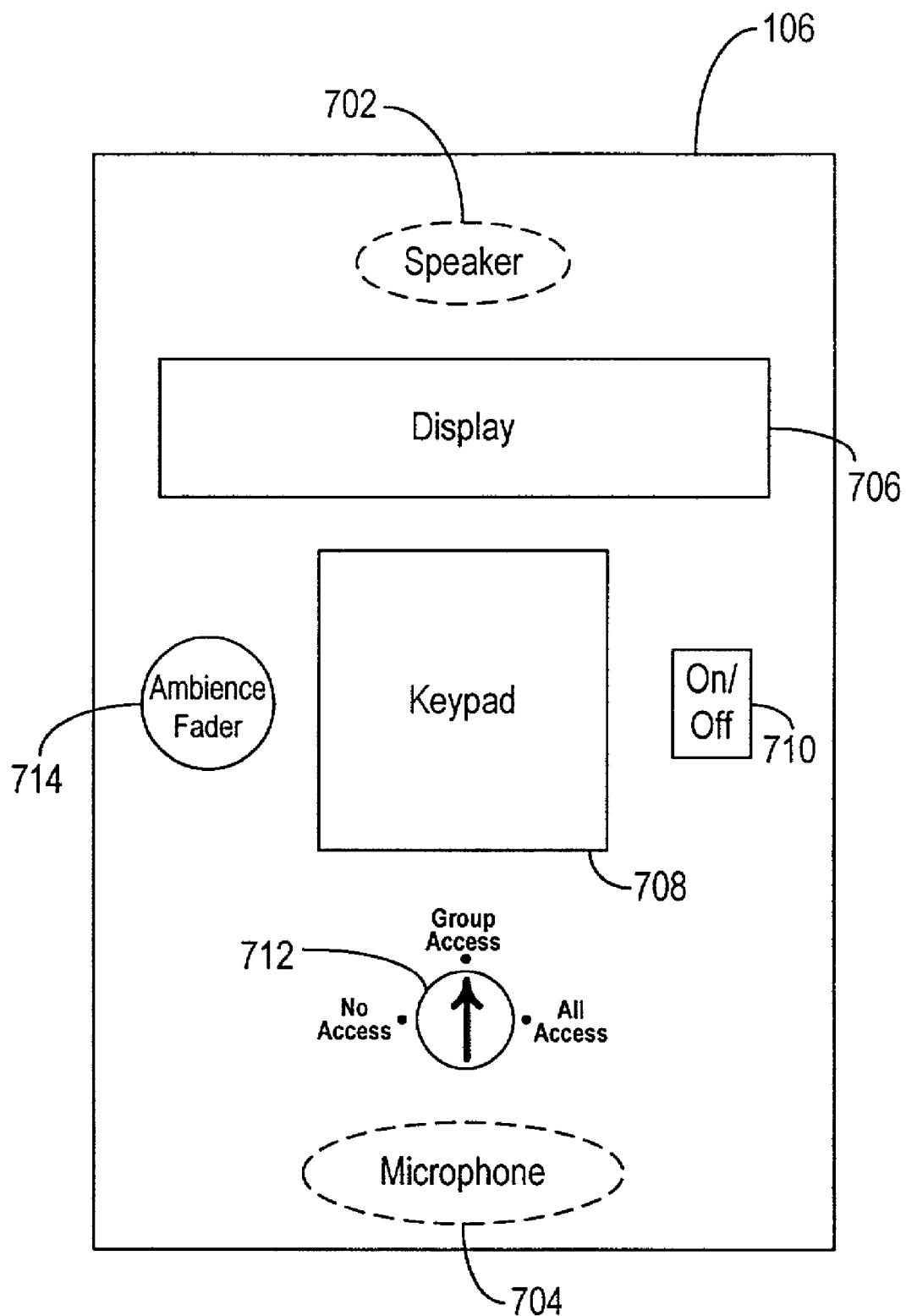
FIG. 7 is a simplified diagram of a communication device according to an embodiment of the present invention.

FIG. 7 is a simplified diagram of a communication device 106 according to an embodiment of the present invention. As depicted in FIG. 7, communication device 106 comprises a speaker 702, a microphone 704, a display 706, a keypad 708, a power on/off button 710, a tri-state switch 712, and an ambience fader button 714. It should be understood that communication device 106 depicted in FIG. 7 is intended only as a specific example of a communication device according to an embodiment of the present invention and does not limit the scope of the invention as recited in the claims. One of ordinary skill in the art would recognize other variations, modifications, and alternatives. Many other configurations of communication device 106 are possible having more or fewer components than the device depicted in FIG. 7. Communication device 106 may be embodied as a walkie-talkie, a CB radio, a cellular telephone incorporating digital and/or analog technologies, a cellular telephone equipped with walkie-talkie capabilities (e.g., a Nextel phone with direct connect feature), a telephone, a data computing device, or any other device capable of transmitting and receiving audio information.

Audio information received by communication device 106 from other communication devices or from AIRS 102 is output to the user via speaker 702. The user may input audio information to be transmitted using communication device 106 via microphone 704. Communication device 106 may be switched on or off using button 710. The user may enter information into communication device 106 using keys of keypad 708. For example, information (e.g., information specifying the time and/or event triggering the broadcast) for configuring AIRS 102 to broadcast information may be entered by the user of communication device 106 using keypad 708. Information related to information received by communication device 106 or information transmitted by communication device 106, various menus and user-selectable features, and other information may be displayed to the user via display 706.

Tri-state switch 712 allows the user to specify access permissions for audio information originating from communication device 106 and archived by AIRS 102. As shown in FIG. 7, switch 712 may be set to one of three states including a "No Access" state, a "Group Access" state, and an "All Access" state. AIRS 102 may be configured to deny all users access to any audio information originating from communication device 106 when tri-state switch 712 is set to the "No Access" state. Only members of the group to which the user of communication device 106 belongs may be allowed to access information originating from communication device 106 when tri-state switch 712 is set to the "Group Access" state. All users, irrespective of the groups to which the users belong, may be allowed to access information originating from communication device 106 when tri-state switch 712 is set to the "All Access" state. In the embodiment depicted in FIG. 7, tri-state switch 712 is set to the "Group Access" state.

Ambience fader button 714 allows the user of communication device 106 to mask audio information received by communication device 106. For example, when button 714 is activated, audio information received by communication device 106 is masked or replaced by some other audio signal (referred to as the mask audio signal) that is different from the audio signal received by communication device 106. The mask audio signal is then output to the user instead of the audio information received by communication device 106. For example, audio information corresponding to ocean waves crashing on a beach may be output to the user instead of the audio information received by communication device 106. This feature is very useful in situations where the user of the communication device does not want other people around the user to listen to audio information received by the user's communication device.

The masked audio signal output to the user conveys information to the user that there is some conversation going on and the length of the conversation. According to an embodiment of the present invention, a different mask audio signal may be used to mask audio information received from different speakers or points of origination. For example, a first mask audio signal may be output to the user when audio information is received from a first point of origination, a second mask audio signal may be output to the user when audio information is received from a second point of origination, and so on. In this manner, the mask audio signal output to the user not only conveys information to the user that a conversation is taking place and but also conveys information about the speakers or points of origination involved in the conversation. The user can then retrieve the missed conversation from information archived by AIRS 102, as described above.

Although specific embodiments of the invention have been described, various modifications, alterations, alternative constructions, and equivalents are also encompassed within the scope of the invention. The described invention is not restricted to operation within certain specific data processing environments, but is free to operate within a plurality of data processing environments. Additionally, although the present invention has been described using a particular series of transactions and steps, it should be apparent to those skilled in the art that the scope of the present invention is not limited to the described series of transactions and steps. For example, the various processing steps described above may be performed by AIRS 102, or by AIRS 102 in association with other data processing systems.

Further, while the present invention has been described using a particular combination of hardware and software, it should be recognized that other combinations of hardware and software are also within the scope of the present invention. The present invention may be implemented only in hardware, or only in software, or using combinations thereof The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claims.

What is claimed is:

1. A method of archiving audio information communicated between a plurality of communication devices in a point-to-multipoint audio communication system, the method comprising:
  recording audio information transmitted by one or more communication devices of the plurality of communication devices;
  determining one or more conversation portions in the recorded audio information, the one or more conversation portions including a first conversation portion;
  determining a set of one or more communication devices that transmitted audio information included in the first conversation portion;
  identifying a first communication device from the plurality of communication devices determined to have missed the first conversation portion when the audio information was transmitted by the set of communication devices; and
  communicating the first conversation portion to the first communication device.

2. The method of claim 1 wherein determining the one or more conversation portions in the recorded audio information comprises:
  identifying a set of one or more utterance portions in the recorded audio information, each utterance portion characterized by a start point and an end point, wherein an amplitude of the recorded audio information is used to determine the start point and end point for each utterance portion; and
  determining the one or more conversation portions based upon locations of utterance portions included in the set of utterance portions.

3. The method of claim 2 wherein:
  the start point of an utterance portion occurs when the average amplitude of the recorded audio information is greater than a first threshold value for a first time period; and
  the end point of an utterance portion occurs after a start point when the average amplitude of the recorded audio information is less than a second threshold value for at least a second time period.

4. The method of claim 3 wherein the first time period is approximately ½ second and the second time period is approximately 3 seconds.

5. The method of claim 3 wherein determining the one or more conversation portions based upon the locations of the one or more utterance portions included in the set of utterance portions comprises:
  grouping utterance portions in the set of utterance portions into one or more groups based upon time gaps between adjacent utterance portions, each group comprising one or more utterance portions from the set of utterance portions, wherein the time gap between adjacent utterance portions in a group is less than a third time period, each group corresponding to a conversation portion.

6. The method of claim 5 wherein the third time period is approximately 3 minutes.

7. The method of claim 1 further comprising:
  for each communication device in the set of communication devices, determining a portion of the audio information included in the first conversation portion transmitted by the communication device.

8. The method of claim 1 wherein determining the set of one or more communication devices that transmitted the audio information included in the first conversation portion comprises:
  determining one or more device identifiers from the audio information included in the first conversation portion; and
  determining a communication device corresponding to each device identifier in the one or more device identifiers.

9. The method of claim 8 further comprising:
  determining identity of a user of each communication device in the set of communication devices based upon the one or more device identifiers.

10. The method of claim 1 wherein determining the set of one or more communication devices that transmitted the audio information included in the first conversation portion comprises:
  determining information identifying one or more speakers of the audio information included in the first conversation portion; and
  identifying the set of one or more communication devices based upon the information identifying the one or more speakers.

11. The method of claim 1 further comprising:
  transcribing the audio information included in the first conversation portion to generate a text transcript for the first conversation portion; and
  storing the text transcript.

12. The method of claim 11 further comprising:
  determining a set of one or more communication devices that transmitted audio information included in the first conversation portion; and
  wherein the text transcript for the first conversation portion comprises information identifying one or more users of communication devices in the set of communication devices.

13. The method of claim 12 wherein the information identifying the one or more users of communication devices in the set of communication devices comprises images of the one or more users.

14. The method of claim 11 wherein transcribing the audio information included in the first conversation portion comprises manually transcribing the audio information included in the first conversation portion.

15. The method of claim 1 further comprising:
  receiving a request from a second device requesting the first conversation portion; and
  in response to receiving the request, communicating the first conversation portion to the second device.

16. The method of claim 1 further comprising:
  storing the first conversation portion in a first format, the first format including a transcript of audio information included in the first conversation portion and information identifying users of the set of communication devices, wherein
  communicating the first conversation portion to the first communication device comprises communicating the first conversation portion stored in the first format to the first communication device.

17. The method of claim 16 wherein the first format is a web page.

18. The method of claim 15 wherein communicating the first conversation portion to the second device comprises:
  determining if a user of the second device is permitted to access the first conversation portion; and communicating the first conversation portion to the second device only if the user of the second device is permitted to receive the first conversation portion.

19. The method of claim 1 further comprising:
receiving information requesting broadcast of audio information included in the first conversation portion at a first time; and
broadcasting the audio information included in the first conversation portion to the plurality of communication devices at the first time.

20. The method of claim 1 further comprising:
receiving information requesting broadcast of audio information included in the first conversation portion upon occurrence of a first event; and
broadcasting the audio information included in the first conversation portion to the plurality of communication devices when the first event occurs.

21. The method of claim 1 further comprising:
receiving permission information from the one or more communication devices that transmitted the audio information, the permission information received from each communication device from the one or more communication devices indicating access permissions for audio information transmitted by the communication device; and
storing the permission information.

22. The method of claim 21 wherein the permission information for a communication device is configured using a user-selectable switch provided by the communication device.

23. The method of claim 21 further comprising:
receiving a request from a second device requesting the first conversation portion;
determining if the second device is permitted to access the first conversation portion based upon the permission information; and
communicating the first conversation portion to the second device only if the user of the second device is permitted to receive the first conversation portion.

24. The method of claim 1 wherein communicating the first conversation portion to the first communication device comprises:
determining that the first communication device is receptive to receipt of the first conversation portion; and
transmitting the first conversation portion to the first communication device.

25. The method of claim 24 wherein determining that the first communication device is receptive to receipt of the first conversation portion comprises receiving a broadcast from the first communication device.

26. The method of claim 1 further comprising storing the first conversation portion.

27. A method of storing audio information communicated between a plurality of communication devices in a point-to-multipoint audio communication system, the method comprising:
recording audio information transmitted by the plurality of communication devices;
determining one or more conversation portions in the recorded audio information, the one or more conversation portions including a first conversation portion;
transcribing audio information included in the first conversation portion to generate a text transcript for the first conversation portion;
storing the text transcript such that a user can subsequently retrieve the text transcript;

determining a set of one or more communication devices that transmitted audio information included in the first conversation portion;
identifying a first communication device from the plurality of communication devices determined to have missed in the first conversation portion when the audio information was transmitted by the set of communication devices; and
communicating the stored text transcript to the first communication device.

28. The method of claim 27 wherein determining the one or more conversation portions in the recorded audio information comprises:
determining a set of one or more communication devices that transmitted audio information included in the first conversation portion.

29. The method of claim 28 further comprising:
for each communication device in the set of communication devices, determining a portion of the audio information included in the first conversation portion transmitted by the communication device.

30. A system for archiving audio information communicated between a plurality of communication devices in a point-to-multipoint audio communication system, the system comprising:
a memory;
a communication module configured to record audio information transmitted by one or more communication devices of the plurality of communication devices; and
a processor module configured to:
determine one or more conversation portions in the recorded audio information, the one or more conversation portions including a first conversation portion;
determine a set of one or more communication devices that transmitted audio information included in the first conversation portion;
identify a first communication device from the plurality of communication devices determined to have missed the first conversation portion when the audio information was transmitted by the set of communication devices; and
cause the communication module to communicate the first conversation portion to the first communication device.

31. The system of claim 30 wherein to determine the one or more conversation portions in the recorded audio information, the processor module is configured to:
identify a set of one or more utterance portions in the recorded audio information, each utterance portion characterized by a start point and an end point, wherein an amplitude of the recorded audio information is used to determine the start point and end point for each utterance portion; and
determine the one or more conversation portions based upon locations of utterance portions included in the set of utterance portions.

32. The system of claim 31 wherein:
the start point of an utterance portion occurs when the average amplitude of the recorded audio information is greater than a first threshold value for a first time period; and
the end point of an utterance portion occurs after a start point when the average amplitude of the recorded audio information is less than a second threshold value for at least a second time period.

33. The system of claim 32 wherein the first time period is approximately ½ second and the second time period is approximately 3 seconds.

34. The system of claim 32 wherein to determine the one or more conversation portions based upon the locations of the one or more utterance portions included in the set of utterance portions, the processor module is configured to:
 group utterance portions in the set of utterance portions into one or more groups based upon time gaps between adjacent utterance portions, each group comprising one or more utterance portions from the set of utterance portions, wherein the time gap between adjacent utterance portions in a group is less than a third time period, each group corresponding to a conversation portion.

35. The system of claim 34 wherein the third time period is approximately 3 minutes.

36. The system of claim 30 wherein, for each communication device in the set of communication devices, the processor module is configured to determine a portion of the audio information included in the first conversation portion transmitted by the communication device.

37. The system of claim 30 wherein to determine the set of one or more communication devices that transmitted the audio information included in the first conversation portion, the processor module is configured to:
 determine one or more device identifiers from the audio information included in the first conversation portion; and
 determine a communication device corresponding to each device identifier in the one or more device identifiers.

38. The system of claim 37 wherein the processor module is further configured to determine identity of a user of each communication device in the set of communication devices based upon the one or more device identifiers.

39. The system of claim 30 wherein to determine the set of one or more communication devices that transmitted the audio information included in the first conversation portion, the processor module is configured to:
 determine information identifying one or more speakers of the audio information included in the first conversation portion; and
 identify the set of one or more communication devices based upon the information identifying the one or more speakers.

40. The system of claim 30 wherein the processor module is further configured to:
 transcribe the audio information included in the first conversation portion to generate a text transcript for the first conversation portion; and
 store the text transcript in the memory.

41. The system of claim 40 wherein the processor module is configured to:
 determine a set of one or more communication devices that transmitted audio information included in the first conversation portion; and
 wherein the text transcript for the first conversation portion comprises information identifying one or more users of communication devices in the set of communication devices.

42. The system of claim 41 wherein the information identifying the one or more users of communication devices in the set of communication devices comprises images of the one or more users.

43. The system of claim 40 wherein the processor module is configured to automatically transcribe the audio information included in the first conversation portion.

44. The system of claim 30 wherein the processor module is configured to:
 receive a request from a second device requesting the first conversation portion; and
 in response to receiving the request, cause the communication module to communicate the first conversation portion to the second device.

45. The system of claim 44 wherein the processor module is configured to:
 determine if a user of the second device is permitted to access the first conversation portion; and
 cause the communication module to communicate the first conversation portion to the second device only if the user of the second device is permitted to receive the first conversation portion.

46. The system of claim 30 wherein:
 the processor module stores the first conversation portion in a first format, the first format including a transcript of audio information included in the first conversation portion and information identifying users of the set of communication devices; and
 the communication module communicates the first conversation portion stored in the first format to the first communication device.

47. The system of claim 46 wherein the first format is a web page.

48. The system of claim 30 wherein the processor module is configured to:
 receive information requesting broadcast of audio information included in the first conversation portion at a first time; and
 cause the communication module to broadcast the audio information included in the first conversation portion to the plurality of communication devices at the first time.

49. The system of claim 30 wherein the processor module is configured to:
 receive information requesting broadcast of audio information included in the first conversation portion upon occurrence of a first event; and
 cause the communication module to broadcast the audio information included in the first conversation portion to the plurality of communication devices when the first event occurs.

50. The system of claim 30 wherein the processor module is configured to:
 receive permission information from the one or more communication devices that transmitted the audio information, the permission information indicating access permissions for audio information transmitted by the communication device; and
 store the permission information.

51. The system of claim 50 wherein the permission information for a communication device is configured using a user-selectable switch provided by the communication device.

52. The system of claim 50 wherein the processor module is configured to:
 receive a request from a second device requesting the first conversation portion;
 determine if the second device is permitted to access the first conversation portion based upon the permission information; and
 cause the communication module to communicate the first conversation portion to the second device only if the user of the second device is permitted to receive the first conversation portion.

53. The system of claim 30 wherein causing the communication module to communicate the first conversation portion to the first communication device comprises:
  determining that the first communication device is receptive to receipt of the first conversation portion; and
  transmitting the first conversation portion to the first communication device.

54. The system of claim 53 wherein determining that the first communication device is receptive to receipt of the first conversation portion comprises receiving a broadcast from the first communication device.

55. The system of claim 30 wherein the processor module is further configured to store the first conversation portion.

56. A computer program product stored on a computer readable storage medium for archiving audio information communicated between a plurality of communication devices in a point-to-multipoint audio communication system, the computer program product comprising:
  code for recording audio information transmitted by one or more communication devices of the plurality of communication devices;
  code for determining one or more conversation portions in the recorded audio information, the one or more conversation portions including a first conversation portion;
  code for determining a set of one or more communication devices that transmitted audio information included in the first conversation portion;
  code for identifying a first communication device from the plurality of communication devices determined to have missed the first conversation portion when the audio information was transmitted by the set of communication devices; and
  code for communicating the first conversation portion to the first communication device.

57. The computer program product of claim 56 wherein the code for determining the one or more conversation portions in the recorded audio information comprises:
  code for identifying a set of one or more utterance portions in the recorded audio information, each utterance portion characterized by a start point and an end point, wherein an amplitude of the recorded audio information is used to determine the start point and end point for each utterance portion; and
  code for determining the one or more conversation portions based upon locations of utterance portions included in the set of utterance portions.

58. The computer program product of claim 57 wherein:
  the start point of an ufterance portion occurs when the average amplitude of the recorded audio information is greater than a first threshold value for a first time period;
  the end point of an utterance portion occurs after a start point when the average amplitude of the recorded audio information is less than a second threshold value for at least a second time period; and
  the code for determining the one or more conversation portions based upon the locations of the one or more utterance portions included in the set of utterance portions comprises code for grouping utterance portions in the set of utterance portions into one or more groups based upon time gaps between adjacent utterance portions, each group comprising one or more utterance portions from the set of utterance portions, wherein the time gap between adjacent utterance portions in a group is less than a third time period, each group corresponding to a conversation portion.

59. The computer program product of claim 56 further comprising:
  code for determining, for each communication device in the set of communication devices, a portion of the audio information included in the first conversation portion transmitted by the communication device.

60. The computer program product of claim 56 wherein the code for determining the set of one or more communication devices that transmitted the audio information included in the first conversation portion comprises:
  code for determining one or more device identifiers from the audio information included in the first conversation portion;
  code for determining a communication device corresponding to each device identifier in the one or more device identifiers; and
  code for determining identity of a user of each communication device in the set of communication devices based upon the one or more device identifiers.

61. The computer program product of claim 56 wherein the code for determining the set of one or more communication devices that transmitted the audio information included in the first conversation portion comprises:
  code for determining information identifying one or more speakers of the audio information included in the first conversation portion; and
  code for identifying the set of one or more communication devices based upon the information identifying the one or more speakers.

62. The computer program product of claim 56 further comprising:
  code for transcribing the audio information included in the first conversation portion to generate a text transcript for the first conversation portion; and
  code for storing the text transcript.

63. The computer program product of claim 62
  wherein the text transcript for the first conversation portion comprises information identifying one or more users of communication devices in the set of communication devices.

64. The computer program product of claim 63 wherein the information identifying the one or more users of communication devices in the set of communication devices comprises images of the one or more users.

65. The computer program product of claim 56 further comprising:
  code for receiving a request from a second device requesting the first conversation portion; and
  code for communicating the first conversation portion to the second device in response to receiving the request.

66. The computer program product of claim 65 wherein the code for communicating the first conversation portion to the second device comprises:
  code for determining if a user of the second device is permitted to access the first conversation portion; and
  code for communicating the first conversation portion to the second device only if the user of the second device is permitted to receive the first conversation portion.

67. The computer program product of claim 56 further comprising:
  code for storing the first conversation portion in a first format, the first format including a transcript of audio information included in the first conversation portion and information identifying users of the set of communication devices, wherein
  the code for communicating the first conversation portion to the first communication device comprises code for communicating the first conversation portion stored in the first format to the first communication device.

68. The computer program product of claim 67 wherein the first format is a web page.

69. The computer program product of claim 56 further comprising:
code for receiving information requesting broadcast of audio information included in the first conversation portion at a first time; and
code for broadcasting the audio information included in the first conversation portion to the plurality of communication devices at the first time.

70. The computer program product of claim 56 further comprising:
code for receiving information requesting broadcast of audio information included in the first conversation portion upon occurrence of a first event; and
code for broadcasting the audio information included in the first conversation portion to the plurality of communication devices when the first event occurs.

71. The computer program product of claim 56 further comprising:
code for receiving permission information from the one or more communication devices that transmitted the audio information, the permission information received from each communication device from the one or more communication devices indicating access permissions for audio information transmitted by the communication device; and code for storing the permission information.

72. The computer program product of claim 71 wherein the permission information for a communication device is configured using a user-selectable switch provided by the communication device.

73. The computer program product of claim 71 further comprising:
code for receiving a request from a second device requesting the first conversation portion;
code for determining if the second device is permitted to access the first conversation portion based upon the permission information; and
code for communicating the first conversation portion to the second device only if the user of the second device is permitted to receive the first conversation portion.

74. The computer program product of claim 56 further comprising code for storing the first conversation portion.

75. A system for archiving audio information communicated between a plurality of communication devices in a point-to-multipoint audio communication system, the system comprising:
means for recording audio information transmitted by one or more communication devices of the plurality of communication devices;
means for determining one or more conversation portions in the recorded audio information, the one or more conversation portions including a first conversation portion;
means for determining a set of one or more communication devices that transmitted audio information included in the first conversation portion;
means for identifying a first communication device from the plurality of communication devices determined to have missed the first conversation portion when the audio information was transmitted by the set of communication devices; and
means for communicating the first conversation portion to the first communication device.

76. The system of claim 75 wherein the means for determining the one or more conversation portions in the recorded audio information comprises:
means for identifying a set of one or more utterance portions in the recorded audio information, each utterance portion characterized by a start point and an end point, wherein an amplitude of the recorded audio information is used to determine the start point and end point for each utterance portion; and
means for determining the one or more conversation portions based upon locations of utterance portions included in the set of utterance portions.

77. The system of claim 76 wherein:
the start point of an utterance portion occurs when the average amplitude of the recorded audio information is greater than a first threshold value for a first time period;
the end point of an utterance portion occurs after a start point when the average amplitude of the recorded audio information is less than a second threshold value for at least a second time period; and
the means for determining the one or more conversation portions based upon the locations of the one or more utterance portions included in the set of utterance portions comprises means for grouping utterance portions in the set of utterance portions into one or more groups based upon time gaps between adjacent utterance portions, each group comprising one or more utterance portions from the set of utterance portions, wherein the time gap between adjacent utterance portions in a group is less than a third time period, each group corresponding to a conversation portion.

78. The system of claim 75 further comprising:
means for determining, for each communication device in the set of communication devices, a portion of the audio information included in the first conversation portion transmitted by the communication device.

79. The system of claim 75 further comprising:
means for transcribing the audio information included in the first conversation portion to generate a text transcript for the first conversation portion; and
means for storing the text transcript.

80. The system of claim 75 further comprising:
means for receiving a request from a second device requesting the first conversation portion; and
means for communicating the first conversation portion to the second device in response to receiving the request.

81. The system of claim 80 wherein the means for communicating the first conversation portion to the second device comprises:
means for determining if a user of the second device is permitted to access the first conversation portion; and
means for communicating the first conversation portion to the second device only if the user of the second device is permitted to receive the first conversation portion.

82. The system of claim 75 further comprising:
means for receiving information requesting broadcast of audio information included in the first conversation portion at a first time; and
means for broadcasting the audio information included in the first conversation portion to the plurality of communication devices at the first time.

83. The system of claim 75 further comprising:
means for receiving information requesting broadcast of audio information included in the first conversation portion upon occurrence of a first event; and means for broadcasting the audio information included in the first conversation portion to the plurality of communication devices when the first event occurs.

84. The system of claim 75 further comprising:

means for receiving permission information from the one or more communication devices that transmitted the audio information, the permission information received from each communication device from the one or more communication devices indicating access permissions for audio information transmitted by the communication device, wherein the permission information for a communication device is configured using a user-selectable switch provided by the communication device;

means for receiving a request from a second device requesting the first conversation portion;

means for determining if the second device is permitted to access the first conversation portion based upon the permission information; and means for communicating the first conversation portion to the second device only if the user of the second device is permitted to receive the first conversation portion.

\* \* \* \* \*